United States Patent
Beveridge

(10) Patent No.: US 9,158,434 B2
(45) Date of Patent: Oct. 13, 2015

(54) USER INTERFACE VIRTUALIZATION PROFILES FOR ACCESSING APPLICATIONS ON REMOTE DEVICES

(71) Applicant: VMware, Inc., Palo Alto, CA (US)

(72) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 293 days.

(21) Appl. No.: 13/778,495

(22) Filed: Feb. 27, 2013

(65) Prior Publication Data

US 2013/0290858 A1 Oct. 31, 2013

Related U.S. Application Data

(60) Provisional application No. 61/638,469, filed on Apr. 25, 2012.

(51) Int. Cl.
*G06F 3/0484* (2013.01)
*G06F 17/30* (2006.01)

(52) U.S. Cl.
CPC ........ *G06F 3/0484* (2013.01); *G06F 17/30899* (2013.01)

(58) Field of Classification Search
CPC ........................................................ G06F 9/455
USPC .......................................................... 715/740
See application file for complete search history.

(56) References Cited

U.S. PATENT DOCUMENTS

| | | |
|---|---|---|
| 6,725,238 B1 | 4/2004 | Auvenshine |
| 6,920,480 B2 | 7/2005 | Mitchell et al. |
| 7,275,212 B2 | 9/2007 | Leichtling |
| 7,418,472 B2 | 8/2008 | Shoemaker et al. |
| 7,676,549 B2 | 3/2010 | McKeon et al. |
| 8,650,494 B1 | 2/2014 | Sampath et al. |
| 2002/0111995 A1 | 8/2002 | Mansour et al. |
| 2008/0255852 A1 | 10/2008 | Hu |
| 2010/0082733 A1 | 4/2010 | Bernstein et al. |
| 2010/0269046 A1 | 10/2010 | Pahlavan et al. |
| 2010/0269047 A1 | 10/2010 | Pahlavan et al. |
| 2010/0269152 A1 | 10/2010 | Pahlavan et al. |
| 2011/0138295 A1 | 6/2011 | Momchilov et al. |
| 2011/0246904 A1 | 10/2011 | Pinto et al. |
| 2011/0314093 A1 | 12/2011 | Sheu et al. |
| 2012/0042271 A1 | 2/2012 | Ma et al. |
| 2012/0226985 A1 | 9/2012 | Chervets et al. |
| 2012/0311457 A1 | 12/2012 | O'Gorman |

(Continued)

OTHER PUBLICATIONS

Extended European Search Report, dated Jul. 22, 2013, Application No. EP 13164249.8, 7 pages.
Cheng-Li Tsao: "SmartVNC: An Effective Remote Computing Solution for Smartphones", Sep. 23, 2011, pp. 13-24, XP055070896, ACM, [retrieved from the Internet on Jul. 11, 2013].

(Continued)

*Primary Examiner* — Omar Abdul-Ali

(57) ABSTRACT

User interface virtualization describes a technique for providing a user with access to one computing device from another computing device, while translating the ergonomics of one computer's user interface style into the ergonomics of the other's. An agent running on the remote desktop may use an interface interaction API or software framework to programmatically manipulate the user interface of the remote desktop and act as a proxy for a corresponding client running on a client device that accepts a "touch and swipe" style input. A user interface virtualization profile is used to specify application-specific augmentations and application-specific support for the interface interaction API.

17 Claims, 5 Drawing Sheets

(56) References Cited

U.S. PATENT DOCUMENTS

| | | |
|---|---|---|
| 2013/0055102 A1 | 2/2013 | Matthews et al. |
| 2013/0132856 A1 | 5/2013 | Binyamin et al. |
| 2013/0246932 A1 | 9/2013 | Zaveri et al. |
| 2013/0290856 A1 | 10/2013 | Beveridge et al. |
| 2013/0290857 A1 | 10/2013 | Beveridge |
| 2014/0013234 A1 | 1/2014 | Beveridge et al. |
| 2014/0082512 A1 | 3/2014 | Neuert et al. |

OTHER PUBLICATIONS

Australian Office Action Patent Application No. 2013204723 dated Nov. 12, 2014, 3 pages.

USER INTERFACE VIRTUALIZATION PROFILES FOR ACCESSING APPLICATIONS ON REMOTE DEVICES

CROSS-REFERENCE TO RELATED APPLICATION(S)

This application claims the benefit of U.S. Provisional Patent Application No. 61/638,469, filed Apr. 25, 2012, and entitled "User Interface Virtualization," the entire contents of which are incorporated by reference herein.

This invention is related to U.S. patent application Ser. No. 13/646,993, filed Oct. 8, 2012 and entitled "User Interface Virtualization for Remote Devices", and to U.S. patent application Ser. No. 13/658,291 filed Oct. 23, 2012 and entitled "User Interface Virtualization Techniques", the entire contents of which are incorporated by reference herein.

BACKGROUND

Server-based computing allows a networked client device, remotely situated with respect to a server computing system, to access computing resources on the server. For example, the client device may run desktop remoting client software and hardware that uses a remote desktop protocol, such as Remote Desktop Protocol (RDP), Virtual Network Computing (VNC), or Personal Computer over Internet Protocol (PCoIP), to access a desktop remotely. The desktop remoting client software displays an image of a graphical user interface generated by the operating system and applications running at the server computing system, e.g., in a virtual machine. The term "desktop" can refer to a virtual machine or physical system accessed by an end user as a local (to the user) desktop or workstation computer. The term "desktop" may also refer to the human interface environment through which users can launch, interact with, and manage applications, settings, and data. The remote desktop is accessible by the user using the remote desktop protocol and a desktop remoting client. The client device typically has a local set of input and output devices (e.g., display, keyboard, mouse) and transmits user input such as keyboard or mouse input to the remote system to be processed there and receives display and other data (e.g., sound) for presentation to the user using the local set of I/O devices.

However, users of client devices with touch-screens face several challenges when interfacing with traditional desktop-based applications (e.g., Microsoft Windows® applications) and desktops through a remote display protocol. One challenge relates to latency of the network connection between the touch-screen device and the remote desktop, which often creates a halting or jittery user experience. Another challenge relates to attempts to remotely control a conventional "point-and-click" driven interface (e.g., Windows® interface) from a touch-screen device which is designed not for traditional "point-and-click" interactions, but rather, for touch-screen gestures and "finger swipe" style of interactions.

Consequently, there is a need for improved systems and methods for providing access to a remote desktop having one style of user interface to a client device having a different style of user interface.

SUMMARY

One or more embodiments of the present invention provide a method of providing access to a graphical user interface (GUI) of a server device having a guest operating system executing therein. The method includes launching an application in the remote desktop of the server device, wherein the application includes one or more elements of a graphical user interface (GUI) and retrieving a user interface virtualization profile associated with the application. The method further includes generating user interface (UI) metadata that specifies the GUI of the application, wherein the UI metadata is generated according to the user interface virtualization profile and using an application programming interface (API) configured to programmatically manipulate the GUI of the application. The method includes transmitting a base image of the GUI and the generated UI metadata to a touch input client device communicatively connected to the server device. The method further includes receiving, from the touch input client device, an input event indicating manipulation of the GUI of the application, and invoking the API to programmatically manipulate the GUI of the application according to the received input event and further according to the user interface virtualization profile.

Embodiments of the present application provide a non-transitory computer-readable storage medium comprising instructions that, when executed in a computing device, provide access to a remote desktop of a server device having a guest operating system by performing the steps of launching an application in the remote desktop of the server device, wherein the application includes one or more elements of a graphical user interface (GUI), retrieving a user interface virtualization profile associated with the application, generating user interface (UI) metadata that specifies the GUI of the application, wherein the UI metadata is generated according to the user interface virtualization profile and using an application programming interface (API) configured to programmatically manipulate the GUI of the application, transmitting a base image of the GUI and the generated UI metadata to a touch input client device communicatively connected to the server device; receiving, from the touch input client device, an input event indicating manipulation of the GUI of the application; and invoking the API to programmatically manipulate the GUI of the application according to the received input event and further according to the user interface virtualization profile.

Further embodiments of the present invention include a non-transitory computer-readable storage medium that includes instructions that enable a processing unit to implement one or more of the methods set forth above or the functions of the computer system set forth above.

DETAILED DESCRIPTION

Embodiments of the invention provide a technique and system for user interactions on a client system with one user interface scheme (e.g., touch screen) to remotely operate a server system with another user interface scheme (e.g., "point-and-click" desktop). A virtual desktop infrastructure (VDI) uses an application programming interface (API) configured to programmatically manipulate and activate graphical user interface (GUI) elements of the server-side desktop to bridge the difference in user interface schemes between the touch screen client system (e.g., tablet computer, smart phone) and server-side desktop. In one embodiment, a user interface virtualization (UIV) profile may be used at the remote desktop and at the client system to describe support by a particular application for the API to programmatically manipulate and activate GUI elements of the application, and further to specify application-specific augmentations.

For example, application frameworks and Application Programming Interfaces (APIs), such as Microsoft Active Accessibility API and Microsoft UI Automation API, may derive contents of UI elements, such as menu navigation, at the server-side desktop which are then passed to the remote client system (e.g., tablet computer) over a network connection (e.g., via desktop remoting protocols). The menu contents are rendered as a native GUI element and engaged on the remote client directly. A user of the remote client can select menu options, launch applications and documents, and perform other common "point-and-click" activities directly on the tablet using a local touch-friendly rendition of these menus. In another example, APIs configured to manage file and file-systems at the server-side desktop (e.g., File Explorer APIs) may be used to facilitate export of document folders for direct document launches and other file functions on the client device. In yet another example, APIs configured to manage process and threads at the server-side desktop (e.g., Application Process API's) allow remote launch and termination of applications using icons on the client device. By shifting key user interface activities such as menu operation, document operations, and application launches from the remote desktop running at the server to the client, embodiments of the invention dramatically improve user experience of traditional point-and-click applications used on touch screen devices, and augment the traditional remote display protocol driven user experience.

In the following description, numerous specific details are set forth in order to provide a thorough understanding of exemplary embodiments of the present invention. However, it will be apparent to one skilled in the art that the present invention may be practiced without some of these specific details. In other instances, well known process operations and implementation details have not been described in detail in order to avoid unnecessarily obscuring novel aspects of the invention.

Figure 1:
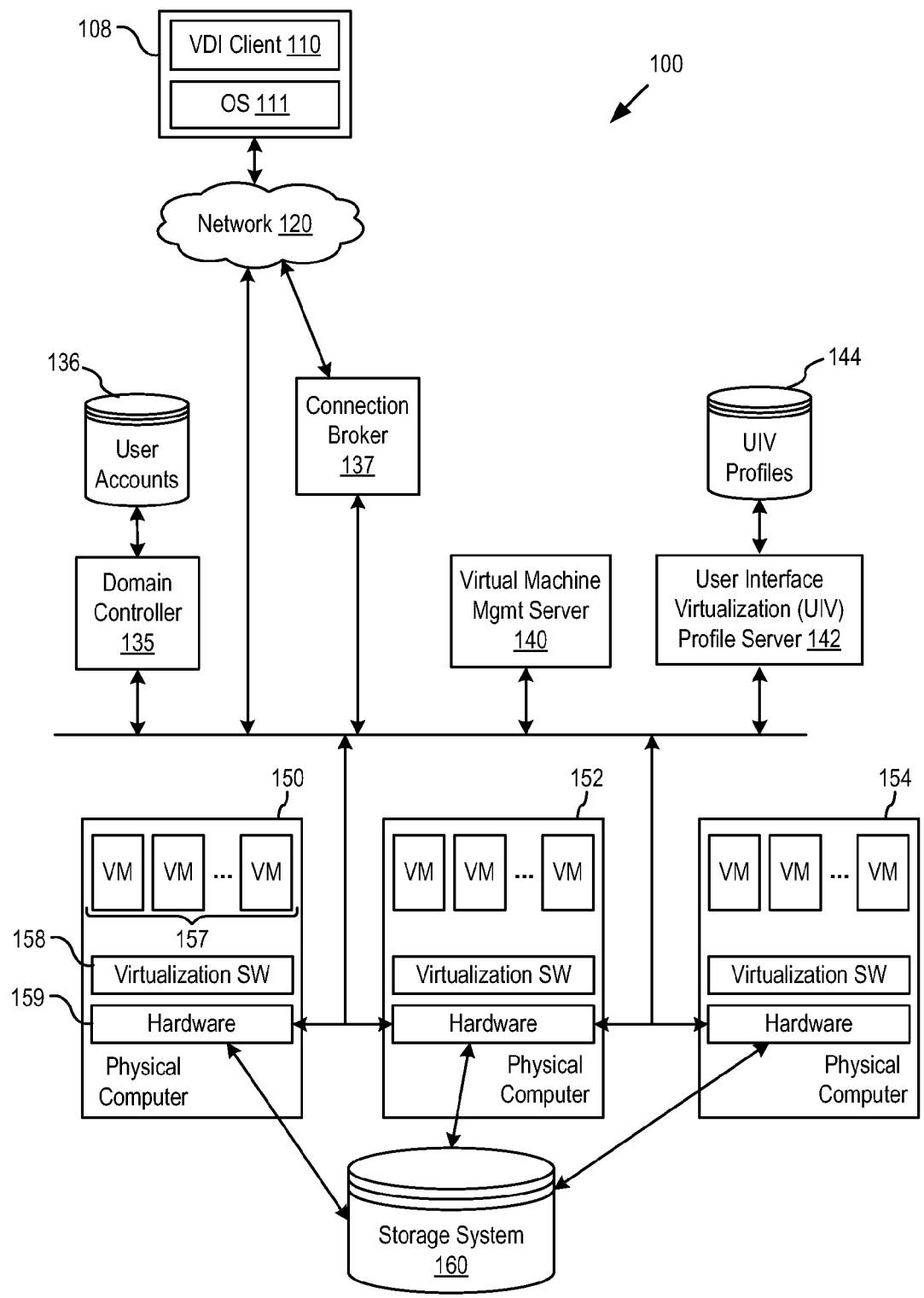
FIG. 1 illustrates components of a virtual desktop infrastructure (VDI) system in which one or more embodiments of the present invention may be implemented.

FIG. 1 illustrates components of a VDI system 100 in which one or more embodiments of the present invention may be implemented. In VDI system 100, VDI client software programs (also referred to as "VDI clients" for short), e.g., VDI client 110, run on operating systems of local computing devices, e.g., client device 108 on top of an operating system (OS) 111. VDI clients provides an interface for the users to access their desktops, which may be running in one of virtual machines 157 or blade server (not shown) in a data center that is remote from the users' location. The term "desktop" may refer to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 may include a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 are instantiated on a plurality of physical computers 150, 152, 154, each of which includes virtualization software 158 and hardware 159. Physical computers 150, 152, 154 may be controlled by a virtual machine management server 140, and be coupled to a shared persistent storage system 160.

According to one embodiment, VDI system 100 includes a user interface virtualization (UIV) profile server 142 that manages UIV profiles 144 for applications running on desktops in the virtual machines 157. In one embodiment, UIV profile server 142 is configured to provide a UIV profile 144 associated with a particular application to requesting desktops to facilitate techniques for user interface virtualization, as described later. One or more UIV profiles 144 may be written for an application according to an application specification that defines which client-side and desktop-side procedures are triggers and in which contexts by activation of defined GUI elements of the application. In some embodiments, UIV profiles 144 may be implemented as a structured or semi-structured data file, for example, such as an Extensible Markup Language (XML) formatted file.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Figure 2:
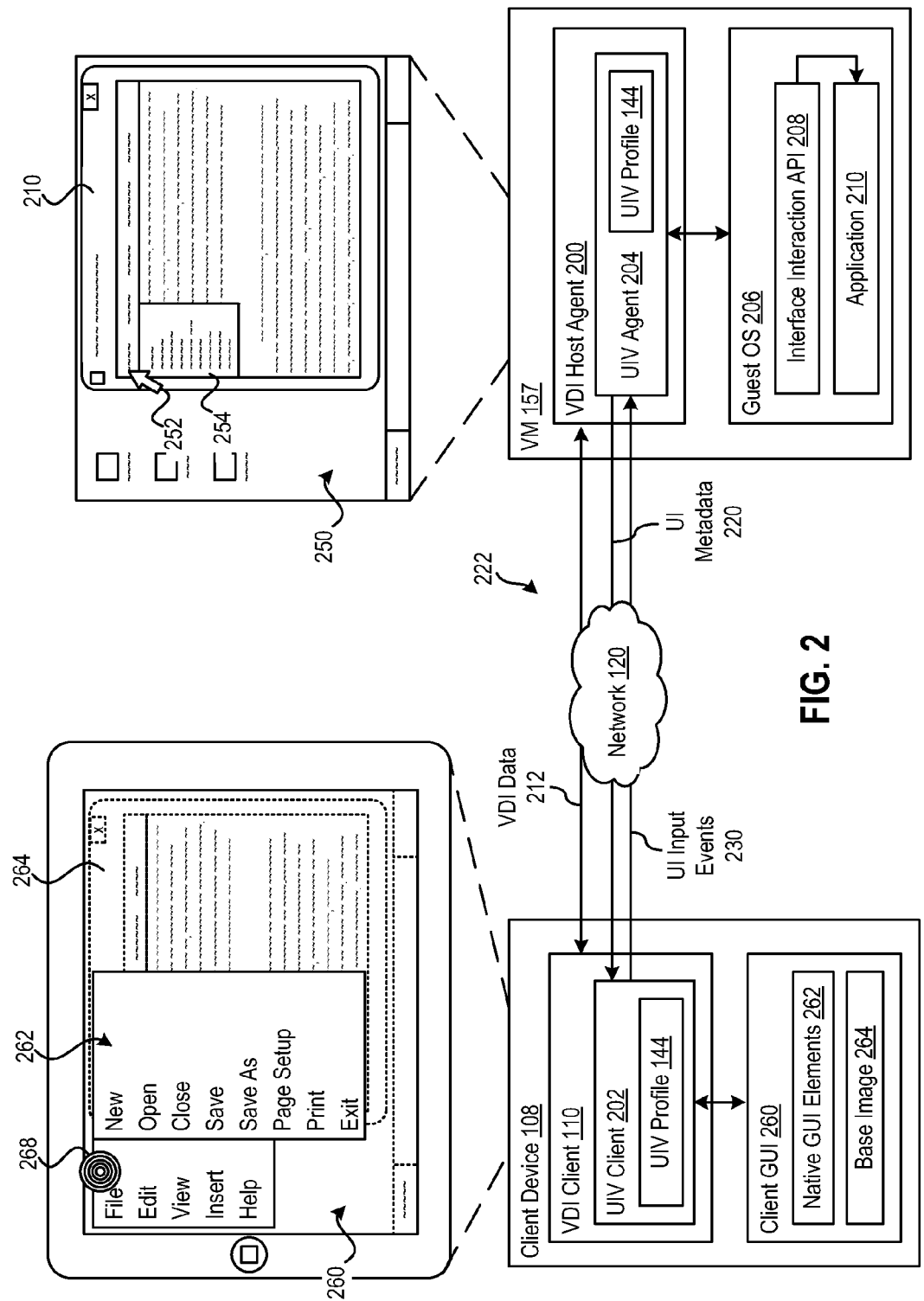
FIG. 2 illustrates in greater detail components of the VDI system in FIG. 1, according to one embodiment of the present invention.

FIG. 2 illustrates in greater detail components of VDI system 100 having a VDI client 110 that enables a user to access a desktop 250 running on VM 157 over network 120. VDI client 110 executing on client device 108 is configured to communicate with a VDI host agent 200 running in VM 157 to exchange VDI data 212 and provide access to remote desktop 250. In the embodiments described herein, client device 108 may be any computing device having an integrated display output and touch screen input. However, the invention should not be understood as being limited to these particular devices. For instance, alternate output devices such as a braille reader, and alternate input devices, such as voice activation (as further described below) may be utilized. Client device 108 typically has a "touch-and-gesture" style user interface that may differ from the "point-and-click" user interface of the desktop running on VM 157.

As shown in a call-out in FIG. 2, desktop 250 may include an application 210 having a traditional "point-and-click"-style user interface that relies on input from a pointer (e.g., mouse cursor 252) to manipulate or interact with UI elements 254 of application 210. The difference in styles of user interface between client device 108 and desktop 250 may worsen user experience and turn routine user tasks into frustrating exercises. This problem is especially clear from FIG. 2. Here, the graphical user interface of remote desktop 250 may have widgets and elements that expect manipulation and interaction with a smaller, more precise pointer (e.g., mouse cursor 252), and as such may have a small size that is difficult to target with a touch input (illustrated as circle 268).

According to an embodiment, VDI client 110 includes a user interface virtualization (UIV) client 202 configured to communicate with a corresponding UIV agent 204 running on VM 157 via a message bus 222 to translate between the "point-and-click" style user interface of the user desktop on VM 157 and the "touch-and-gesture" user interface of client device 108. In one embodiment, UIV agent 204 may be integrated with VDI client 110 and is configured to handle all UIV coordination of user input, UI augmentations, placing data on and off message bus 222, and performing on-the-fly UI transformations that are rendered and displayed at client device 108.

Message bus 222 may be a lightweight message queue system configured to handle queuing and transmission of all UIV-related data, such as user input, remote UI state, and usage data. In one embodiment, UIV client 202 and UIV agent 204 exchange messaging via message bus 222 in the form of UI input events 230 and UI metadata 220 which are translated into remote desktop input and native GUI elements, respectively, at the appropriate endpoints. To handle large blocks of UIV-related data, such as files, program icons, and thumbnail graphics, message bus 222 may be adapted to transport the large blocks as serialized data within the message queue. Alternatively, a lightweight HTTP server may be running on the user desktop to transmit the large blocks, while message bus 222 is used to coordinate transmission payloads for the larger UIV-related data (e.g., sending a custom hyperlink at which the data is available via the lightweight HTTP server).

UIV agent 204 executing on VM 157 is configured to coordinate all UIV-related activities during a user's session with the remote desktop. In one embodiment, UIV agent 204 is configured to invoke an interface interaction API 208 to obtain metadata related to user interface (UI) widgets and elements seen on the desktop of VM 157. In one embodiment, interface interaction API 208 may be an API exposed by guest OS 206 to obtain metadata related to user interface (UI) widgets and elements seen on the desktop of VM 157. For example, interface interaction API 208 may be an API traditionally used by assistive technologies (e.g., screen readers) to make an application running on a guest OS or the guest OS itself more accessible to persons with vision, hearing, or motion impairments, for example, such as Microsoft Accessibility API, or automate software testing, such as Microsoft UI Automation API. Interface interaction API 208 is further configured to expose functionality of UI elements by enabling programmatic access (e.g., for UIV agent 204) to identify, manipulate, and interact with UI elements of guest OS 206 and applications 210 running on guest OS 206.

In one embodiment, interface interaction API 208 may include a software framework configured to build an application such as the Microsoft .NET framework, or the Java Runtime environments. It should be recognized that API 208 may be a logical API inclusive of both OS and application framework APIs configured for the programmatic control of application behavior, and is not restricted to a single literal API provided by the OS or application. UIV Agent 204 may have the ability to perform GPS-style "recalculation" within such application frameworks to determine efficient ways to activate any application function from any other point in an application's interface. Such "recalculation" functionality may be useful to insure injection of user input even when something goes wrong and an application's state is not what VDI client 110 expects at the point where a proxied action is sent to desktop-side UIV agent 204. In one embodiment, UIV agent 204 is configured to intercept rendering of UI elements in order to govern actual display of application menus and other objects, to determine state of an application and its application objects, and to perform simulated user actions on the UI elements. For example, a user's mouse click on an application menu may be intercepted by UIV agent 204 using OS level rendering function interception techniques and the resulting menu contents displayed instead on client device 108 using UIV client 202's local rendering. The application's native menu rendering running inside VM157 is 'spoofed' such that menu contents are not actually displayed inside the OS 206. Such application 'spoofing' avoids unnecessary remote display traffic and aids in de-cluttering the resulting display on Client Device 108.

VDI host agent 200 is configured to exchange VDI data 212 to VDI client 110, including transmitting display data and receiving traditional mouse and keyboard input data according to conventional remote desktop techniques. VDI data 212 may include a base GUI image 264 that is used to display the GUI of remote desktop 250 at client device 108. In some embodiments, base GUI image 264 may be a graphical bitmap or framebuffer illustrating a portion of or an entirety of the display at desktop 250, similar to a screenshot of the remote desktop. In other embodiments, base GUI image 264 may be graphical information for drawings lines, polygons, and other shapes, fonts, and graphical primitives to render an image that displays the GUI of desktop 250 at client device 108.

In addition to VDI data 212 transmitted between VDI client 110 and VDI host agent 200, UIV agent 204 executing on VM 157 is configured to transmit UI metadata 220 to UIV client 202 on client device 108. UI metadata 220 includes information provided by interface interaction API 208 and other interception techniques controlled by UIV agent 204 that are descriptive of one or more UI elements of the user desktop on VM 157. Examples of UI elements that may be specified by UI metadata 220 include windows, buttons, menus, dialog or message boxes, lists, menu bars, scroll bars, title bars, status bars, size grips, toolbars, tree view controls, list view controls, dropdown lists, and input carets. In contrast to previous approaches which used graphical primitives or drawing operations for rendering at a VDI client, UI metadata 220 includes semantic information related to contents and application state of one or more UI elements of the user desktop. For example, rather than merely providing graphical primitives for drawing a rectangle menu, UI metadata 220 provides semantic information representing the contents of the menu, such as the selectable options in the menu. Based on UI metadata 220, VDI client 110 may independently render GUI elements that display, behave, and are interacted with differently than corresponding UI elements on the user desktop on VM 157. As such, UI metadata 220 enables UIV client 202 within VDI client 110 to generate, render, and display native GUI elements (i.e., native to client device 108 in which VDI client 110 is executed) that are most appropriate for the interface style and form factor of client device 108 (e.g., touch screen). In one embodiment, information in the UI metadata 220 may be organized into a hierarchical or tree-like data structure having root elements and child elements corresponding to UI elements of a user desktop, as shown in greater detail in FIG. 3.

Figure 3:
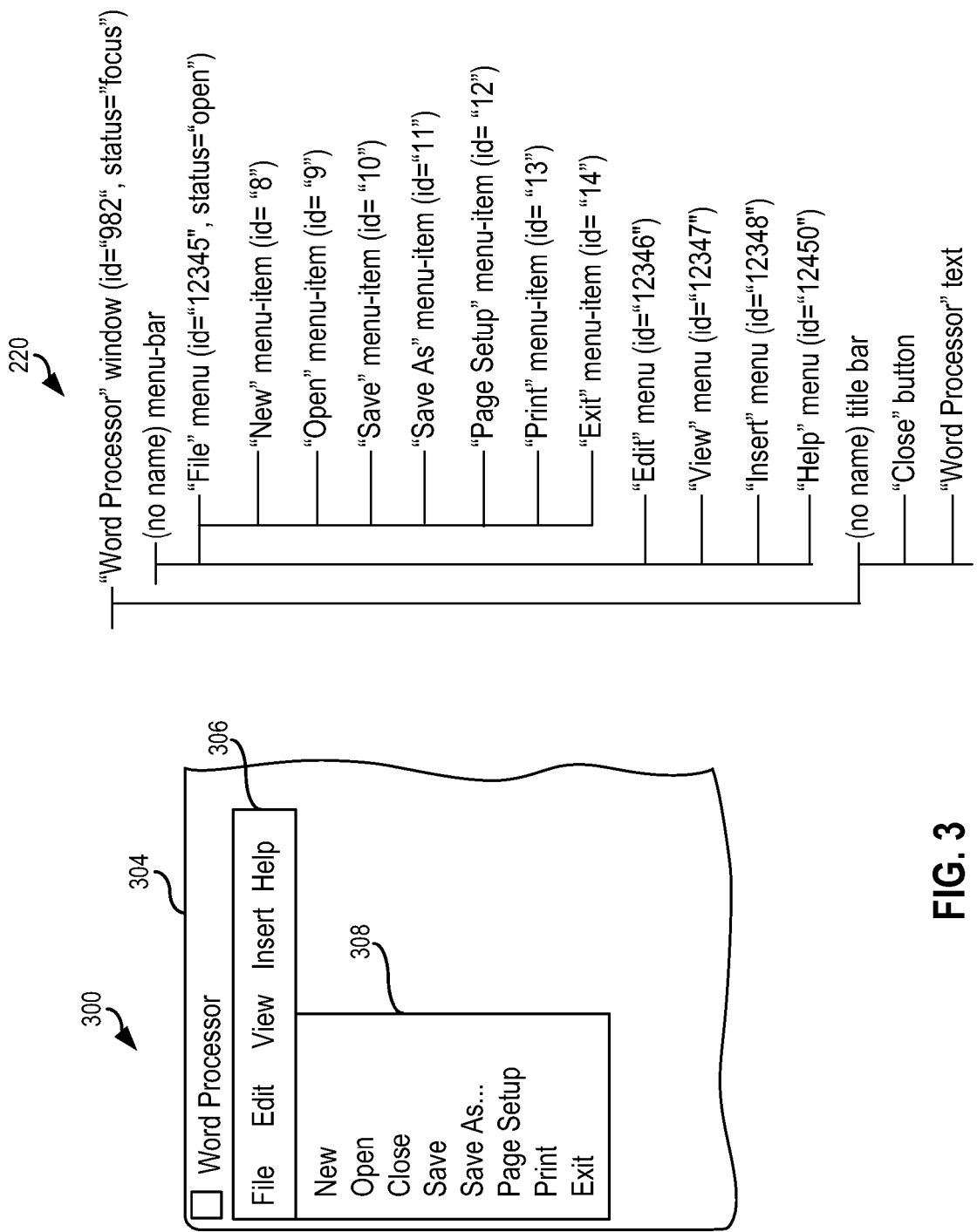
FIG. 3 illustrates a graphical user interface having a plurality of UI elements and corresponding metadata, according to one embodiment of the present invention.

FIG. 3 illustrates a graphical user interface 300 for an application 210 having corresponding UI metadata 220, according to one embodiment of the present invention.

Graphical user interface 300 may be made of UI elements and sub-elements. As shown, graphical user interface 300 of application 210 includes a window 304 having a menu bar 306 with a plurality of menu options (e.g., "File," "Edit," "View," "Help," etc.). Each of these menu options may activate a submenu 308 which contains further options (e.g., "New," "Open," "Save," "Exit," etc.) and possible pop-out menus or dialog boxes.

In one embodiment, interface interaction API 208 allows application 210 to expose a tree structure of UI metadata 220 that represents the structure of graphical user interface 300. Elements in the tree expose properties and methods that facilitate programmatic manipulation of the GUI on desktop 250. In one embodiment, UI metadata 220 may include, for each UI element specified, a label for a UI element that is predetermined (e.g., assigned in code by a developer of application 210 and guest OS 206); role information describing the type of UI element (e.g., ROLE_SYSTEM_PUSHBUTTON); properties that describe a UI element's state at a given moment in time (e.g., invisible, unavailable, focused, focusable, pressed, etc); and other values contained in a UI element (e.g., percentages, integers, non-integers, textual, visual) that may indicate information represented by the UI element. For example, UI metadata 220 may include information for window 304 that includes an identifier (e.g., id="982"), a state property indicating a window 304 is in "focus" within the remote desktop, and information for UI elements contained within window 304 (e.g., title bar and menu bar 306). In another example, metadata for menu 308 includes information for a plurality of menu items within menu 308, such as items for "New," "Open," "Save," etc. In some embodiments, UI metadata 220 may include graphical data, such as thumbnails or icons, associated with UI elements on desktop 250.

Referring back to FIG. 2, according to one embodiment, UIV agent 204 may use a UIV profile 144 that specifies application-specific optimizations for generating UI metadata 220 and responding to UI input events 230. Similarly, UIV client 202 may use a UIV profile 144 for interpreting UI metadata 220 and providing application-specific UIV augmentations at client device 108. UIV profiles 144 enable remote desktops and client devices to adapt to custom elements and custom behavior of a particular application 210. It should be recognized that because it is up to each software developer to implement an application 210 to expose properties of the application's GUI to interface interaction API 208, applications may vary in their degree of compliance with best practices associated with interface interaction API 208. For example, some applications may incorrectly list menu contents as toolbar contents (e.g., ROLE_SYSTEM_TOOLBAR rather than ROLE_SYSTEM_MENUBAR). Such inconsistencies may be captured in an application-specific UIV profile 144 that is processed by UIV agent 204. In other examples, UIV profile 144 may specify custom icons used to enhance menu representation at client device 108, or may specify filters that hide menu items pre-determined as unlikely to be used from tablets (e.g., client device 108).

UIV client 202 is configured to construct a "native" UI element or widget (e.g., "touch-and-gesture"-style GUI element 262) having the same functionality and information as a corresponding UI element or widget (e.g., "point-and-click"-style UI element 254) on the remote desktop based on UI metadata 220 received from UIV agent 204. Native GUI elements 262 generated by UIV client 202 may be configured to be "touch-friendly" and different than corresponding UI elements of desktop, such as having differences in size, shape, color, style, manner of interaction, animation, and interactive behavior. As shown, VDI client 110 may overlay native GUI element 262 on top of base GUI image 264 represented in VDI data 212 to form a client GUI 260.

In one embodiment, VDI client 110 is configured to expose an array of standardized client-side procedures, or "hooks," used for the display of native UI elements 262 resulting from the parsing and transformation of OS and application UI elements 254. The array of client-side hooks may use native graphical frameworks or user interface frameworks of client device 108 to render one or more native GUI elements based on the received UI metadata 220. As such, by using native graphical frameworks or user interface frameworks that are local to client device 108, embodiments of the present invention offload work and rely on the graphical capabilities of client device 108 and advantageously improve responsiveness of the GUI. In some embodiments, VDI client 110 includes client-side hooks configured to generate native GUI elements having a size and shape that more readily facilities activation by a touch object (e.g., human finger or stylus) as compared to a GUI element configured for activation by a pointer or mouse cursor. Client-side hooks may be configured to generate native GUI elements responsive to touch-based input and gestures, including taps, swipes, multi-point gestures, etc. As such, the user experiences an improved user interface because VDI client 110 enables the user to interact with native GUI elements that are rendered in a touch-friendly manner yet correspond to UI elements from the remote desktop.

UIV client 202 may instruct VDI client 110 to generate native GUI elements 262 using one or more of the client-side hooks. For example, VDI client 110 may include a hook that generates a native callout GUI element containing launch icons, menu options, and/or common guest operating system functions and optimized for the form factor and touch-screen ergonomics of client device 108. UIV client 202 may use such a hook to present a reformatted version of a navigation menu based on UI metadata 220. In some embodiments, VDI client 110 may include a hook for manipulating status icons or widgets that represent availability of select UIV functions, as may be advertised by UIV agent 204 through UI metadata 220. For example, a UIV client 202 may signal availability of UIV functionality for a particular application to users using a status icon on the periphery of client GUI 260 that changes colors or pops-out in other context-sensitive ways. In some embodiments, VDI client 110 may include a hook that supports detecting gestures used to invoke guest OS and application functions, such as "Save Document" or "Switch to Last Application."

UIV client 202 is further configured to capture user input on the constructed native GUI element 262 and transmit UI input events 230 to UIV agent 204 running in VM 157. In some embodiments, one of the array of client-side hooks provided by VDI client 110 may capture user input on the generated native GUI elements and notify UIV client 202 (e.g., via callback) to enable UIV client 202 to generate UI input events 230 based on touch input 268 that represents interactions with the native GUI element 262. UI input events 230 include information indicating that the corresponding GUI elements at the remote desktop 250 on VM 157 have been manipulated at the client device 108. In some embodiments, UI input events 230 may indicate a selection of, activation of, change of state in, or interaction with a corresponding UI element or option at remote desktop 250. In other embodiments, UI input events 230 may indicate execution or invocation of an operation or option corresponding to a UI element at remote desktop 250.

According to UI input events 230 received from UIV client 202, UIV agent 204 is configured to query and invoke the corresponding UI elements of application 210 or guest OS 206 using interface interaction API 208 to simulate input and facilitate programmatic manipulation of the user interface of the remote desktop on VM 157. In one embodiment, UIV agent 204 may include a set of desktop-side procedures, or hooks, that expose a combination or bundle of pre-determined API calls which may be called by UIV client 202 using one or more UI input events 230. The desktop-side hooks may assemble lower-level programmatic functions for the purpose of a higher level UIV goal, such as the transmission of UI metadata for a navigation menu, or several chained tasks. For example, a desktop-side hook for launching an application may include a bundle of calls to APIs of the guest operating system, such as a call to launch a program (e.g., via a File Explorer API), a call to maximize the window of the launched program (e.g., via a Windowing API), and then generate UI metadata for the navigation menu (e.g., via interface interaction API 208). In some embodiments, UIV agent 204 may be configured to trap point-and-click user input such that clicking on a navigation menu option mutes the native application output, as described earlier, causing the drop down menu to appear instead on client device 108. This enables UIV to continue to assist users even if a user performs some mouse-driven menu navigation.

In some embodiments, UIV client 202 is configured to track usage patterns and generate usage data related to the user's interactions with the native GUI elements. It has been determined that users use different applications and documents on their touchscreen devices than on their desktops. For example, some applications may be more important when mobile, and some documents may get more frequent acess when a user is traveling. As such, tracking such usage patterns may be used for ongoing tuning of the user's UIV transformations. In some embodiments, UIV client 202 may generate native GUI elements (e.g., application launch-pad widgets) configured to display commonly-used applications at the top or other prominent location of the GUI element. In another embodiment, UIV client 202 may construct a "most recent documents" file explorer widget to accelerate access to favored documents.

In one embodiment, UIV client 202 may collect UIV-related usage data and transmit the UIV-related usage data to UIV agent 204 which may store the usage data in an account associated with the user (e.g., a user's Windows profile). UIV agent 204 may activate that usage data during a next UIV-enhanced remote desktop session using client device 108. In some embodiments, a replica of this usage data may be harvested by a server component, such as UIV profile server 142, for data-mining purposes for both the user's benefit and for ongoing tuning of UIV agent and client.

Figure 4:
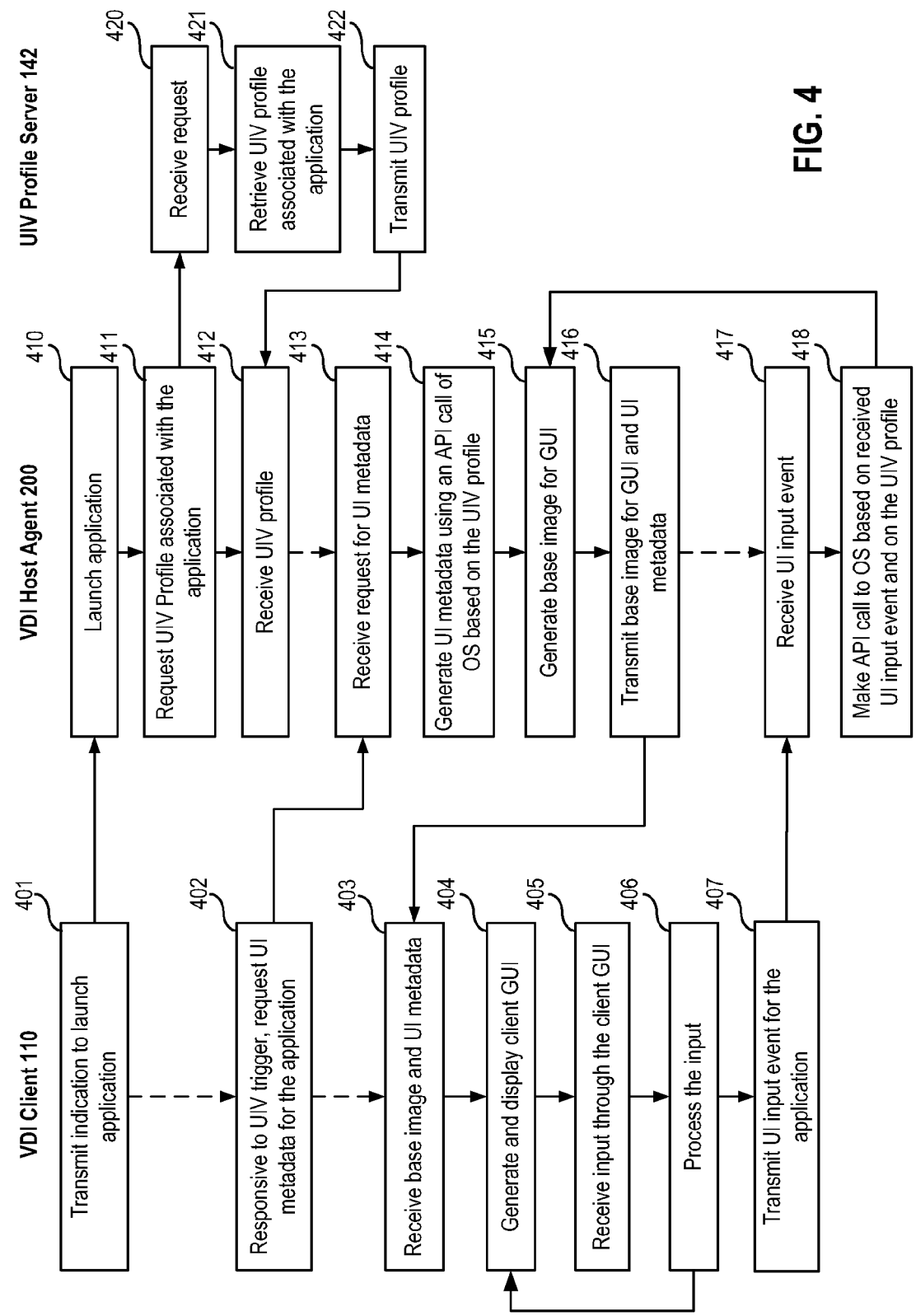
FIG. 4 illustrates a flow diagram for generating and updating a graphical user interface for an application that has been launched in a remote desktop and is to be displayed at a VDI client, according to one embodiment of the present invention.

FIG. 4 illustrates a flow diagram for generating and updating a GUI for an application that has been launched in a remote desktop and is to be displayed at a VDI client. Steps 401-407 are carried out by VDI client 110. Steps 410-418 are carried out by VDI host agent 200 running in a virtual machine that is hosting the remote desktop. Steps 420-422 are carried by UIV profile server 142. While FIG. 4 describes exemplary steps for providing native GUI elements based on UI metadata according to an embodiment of the disclosure, it should be recognized that techniques described herein may be applied to a variety of UI experiences, including menu navigation, file dialogs, clipboard functions, launching of applications and documents, desktops, and application-specific experiences, as described later.

At step 401, VDI client 110 transmits an indication to launch an application (e.g., application 210) within a session of the remote desktop. In some embodiments, the indication may be transmitted in response to receiving user input, such as a tap or other selection on an application icon. In other embodiments, the indication may be transmitted in response to selection of an application icon in a UIV-generated application launcher.

At step 410, in response to receiving the indication, VDI host agent 200 launches the application and requests a UIV profile 144, if available, associated with the launched application from UIV profile server 142, at step 411. In some embodiments, VDI host agent 200 may retrieve a locally cached copy of UIV profile data if this application has been launched recently. For example, the UIV profile data may be cached locally in the user's Windows user profile in the form of locally cached XML files describing the UIV interactions for a given application. Such locally cached copies may have an expiration at which point the VDI host agent 200 may request more recent copies from UIV profile server 142, either proactively, or at some other time such as user login to Windows or at the point of application launch. At step 420, UIV profile server 142 receives the request.

At step 421, UIV profile server 142 determines whether any UIV profile exists for the specified application, and if so, retrieves a UIV profile 144 associated with the application. In some embodiments, UIV profile server 142 retrieves a UIV profile associated with a particular application based on one or more of a specified application name, application provider or publisher, or suitable unique identifier associated with the application. UIV profiles 144 may be versioned and tied to particular versions of an application. For example, one UIV profile may be associated with version 5.0 of a word processing application, and another UIV profile may be associated with an earlier version 4.0 of the same application. At step 422, UIV profile server 142 transmits key elements of the retrieved UIV profile 144 to VDI host agent 200, which receives the UIV profile at step 412. Other elements of the UIV profile such as usage statistics and other management data may remain on UIV profile server 142 and may be used for management purposes.

At step 402, responsive to detecting a UIV trigger, VDI client 110 requests UI metadata from VDI host agent 200, which receives the request at step 413. It should be appreciated that, in one embodiment of the present invention, a request for UIV metadata may be a specialized form of a general UI input event 230. VDI client 110 may detect a UIV trigger performed by a user operating client device 108. In one embodiment, the UIV trigger may be a pre-determined gesture (e.g., a unique swipe gesture) performed by the user or a UI button activated by the user that indicates VDI client 110 should render one or more UI elements of the launched application using native GUI elements. In some embodiments, the UIV trigger may be received by a client-side hook of VDI client 110 that passes the trigger to UIV client 202.

At step 414, in response to receiving a request for UI metadata, VDI host agent 200 generates UI metadata 220 corresponding to one or more UI elements of application 210 using an API call to interface interaction API 208 and based on UIV profile 144. For example, VDI host agent 200 may obtain a hierarchical menu structure having a list of menus, sub-menus, and menu items of the launched application 210. In some embodiments, the request for UI metadata may be a call to a desktop-side hook of VDI host agent 200 that results in calls to interface interaction API 208 and/or other APIs of guest OS 206 or other application frameworks such as Microsoft .NET or Java Runtime environments. The request for UI metadata may be mapped to a call to a desktop-side hook of VDI host agent 200 according to UIV profile 144 retrieved at step 411. For example, a UIV profile 144 associated with the launched application 210 may specify a particular name of the menu bar as assigned in the application's code by a developer such that UI metadata describing the application's menu bar may be retrieved by querying interface interaction API 208 for that particular name. In another example, a UIV profile 144 associated with the launched application 210 may specify tablet-optimized graphical icons corresponding to menu items in the menu bar to be incorporated into the generated UI metadata.

In some embodiments, a set of commonly used UIV-related functionality may be defined for all applications running within guest OS 206, including menu navigation, navigation of file dialogs, application or document launch, a clipboard function that temporarily stores data via cut-copy-paste operations, and window or task switching. The UIV profile may further contain 'hash signatures' for various graphical elements useful for mapping iconic and widget images to pre-existing images resident in a tablet side cache managed by UIV client 202. These hash signatures may be small in size and can be rapidly checked for a match against the UIV client's image cache, thereby minimizing the need for transmission of such graphical data to the UIV client 202. UIV profile 144 associated with the launched application 210 may indicate which of this set of commonly used UIV-related functionality is or is not supported by the launched application 210. As such, based on UIV profile 144, VDI host agent 200 generates UI metadata configured to advertise the available UIV-related functionality of the launched application back to the VDI client 110. In some embodiments, UIV profile 144 may specify application-specific UIV functionality supported by the launched application, described later.

At step 415, VDI host agent 200 generates a base image for the GUI (e.g., according to a VDI protocol established between VDI client 110 and VDI host agent 200) and transmits the base image for the GUI along with UI metadata 220 at step 416. As described above, the base image (e.g., base GUI image 264) provides graphical information for displaying an image of the remote desktop at the client device. In one example, the base image may be raw pixel data, similar to a screenshot, of the entire desktop 250 to be displayed at the client device. In another example, the base image may be an updated set of pixel data to changing at least a portion of earlier-transmitted raw pixel data. In some embodiments, the base image may be drawing operations and graphical primitives for drawing the display of the remote desktop within a client GUI of the client device.

In one embodiment, the UIV client 202 and UIV agent 204 may use messaging bus 222 or message passing service to transmit and receive UI input events 230 and UI metadata 220 across network 120. In another embodiment, VDI host agent 200 may incorporate UI metadata 220 within VDI data 212 passed through a remote display channel (e.g., PCoIP, HTML5) to VDI client 110. Similarly, VDI client 110 may incorporate UI input events 230 within VDI data 212 transmitted to VDI host agent 200.

At step 403, VDI client 110 receives the base image for the GUI along with the UI metadata for the launched application. At step 404, VDI client 110 generates and displays a client GUI 260 based on the received base image 264 and UI metadata 220. The displayed GUI includes the base image received from VDI host agent 200 and native GUI elements 262 that VDI client 110 generated based on the contents of the menu structure. In some embodiments, UIV client 202 calls one or more client-side hooks of VDI client 110 based on the received UI metadata to display native GUI elements corresponding to UI elements of the application at the remote desktop. For example, UIV client 202 passes UI metadata to a client-side hook that generates a native callout GUI element that is overlaid on top of the base image received from VDI host agent 200 and displays contents of the menu bar of the application. In another example, the native GUI elements are included in the displayed GUI as a semi-transparent layer incorporated into the base image received from VDI host agent 200.

At step 405, VDI client 110 detects an input (e.g., a touch screen input) made by the user through the GUI onto the native GUI elements. In response to detecting an input, VDI client 110 processes the input at step 406. In the example of a hierarchical menu structure, the input may be of a type that causes menu items of a lower level to be displayed or may be a final selection. If it is the former, the GUI may be generated for display again, as in step 404. If the input is a final selection from the menu, a UI input event 230, for example, information indicating that a certain menu item has been selected, is transmitted to the VDI host agent at step 407.

At step 417, the VDI host agent receives the UI input event 230 and makes an API call to the guest OS (e.g., to interface interaction API 208) based on the received UI input event 230 and further based on UIV profile 144, at step 418. For example, the VDI host agent makes a call to interface interaction API 208 to communicate that a certain menu item has been selected. The flow may then return to step 415 where the base image for GUI may be regenerated.

In some embodiments, in response to a UIV input event, the VDI host agent may call one or more desktop-side hooks provided by UIV agent 204 to programmatically manipulate the user interface of the application using an identifier that specifies an object within an object model of application 210. In contrast to previous approach which simply invoked the server's keyboard and mouse driver to simulate keyboard and mouse events, UIV agent 204 uses interface interaction API 208 to directly manipulate UI elements of desktop 250 according to the UI input events received from the VDI client. In some embodiments, UIV profile 144 associated with the application may be used to map a UIV input event to one or more desktop-side hooks. UIV agent 204 may pass the received UI input events directly to interface interaction API 208 according to the UIV profile, in cases where UIV client 202 transmits UI input events that are already configured for use by interface interaction API 208. In other embodiments, UIV agent 204 translates received UI input events into events or parameters for interface interaction API 208 (e.g., according to UIV profile 144) to indicate application state or property values of one or more UI elements have been changed. By way of example, UIV agent 204 may use interface interaction API 208 to indicate, for a given UI element, element activation, element selection, spatial navigation, logical navigation, alerts, focus changes, and other property value changes.

According to one embodiment, VDI client 110 improves latency and responsiveness for UI elements that require multiple user interactions, such as scrolling through items in a drop-down list, or navigating menus and sub-menus. In one example use case, menu navigation on a desktop may involve pointing and clicking on a "Edit" menu button, causing a drop-down menu to appear, pointing and clicking on a menu item, which may cause additional menus to appear (e.g., "Paste Special . . . ", etc.). To perform this use case under previous approaches to remote desktops, a VDI client might have to receive an image of a GUI for the window and menu bar over the remote network, and render the appearance of the window menu bar (which might include frames of GUI animation); transmit click input; receive an image of a GUI for the window, menu bar, and now Edit menu over the remote network, and render the appearance of the window, menu bar, and now Edit menu; transmit click input (possibly for one of the menu items), and so forth. In contrast, embodiments of the invention enable VDI client 110 to construct and modify native GUI elements using UI metadata without having to make repeated network requests which increase latency and create a "laggy" user experience. In fact, embodiments of the invention provide a means of accessing menu navigation metadata within an application even before a user selects a menu option. Interface-related operations that use graphical feedback, like drag-and-drop, box resizing, and key animations, are performed locally on the client device, for example, as a remote session overlay, and then executed within the remote session.

While embodiments of the present invention describe a remote desktop system that generates native GUI elements of a touch-based, gesture-driven interface configured for a touch screen on a client device, various embodiments of the client device described herein may include alternative non-touch-based input devices, such as a microphone, accelerometer, gyroscopic sensor, near-field communications sensor, etc., that may be configured to control a remote desktop according to techniques described herein.

Example Application-Specific User Interface Virtualization

While techniques for user interface virtualization described herein may be applied to commonly-used tasks and user interactions (e.g., menu navigation, application or document launch, and clipboard functions), embodiments of the present invention may provide deeper UIV integration and augmentation to specific applications. As such, a catalog of such special integrations may be developed which cater to commonly used legacy applications, such as Microsoft® Office® applications, and add augmented UIV capabilities beyond those that generically apply to all applications. An application-specific pop-out may activate on the VDI client at application launch and provide a set of augmentations that gives a user rapid navigation and task execution for areas of the launched application that struggle under a remote desktop experience.

According to one embodiment, a UIV client 202 may use a UIV profile 144 to generate and display complex and custom GUI elements corresponding to application-specific GUI elements at the remote desktop. One or more UIV profiles 144 may be preloaded onto client device 108 at installation, or stored in a client side cache between sessions, or dynamically retrieved by VDI client 110 for providing application-specific UIV augmentations. Client side cached UIV profiles can be automatically expired by UIV client 202 based on a centrally managed policy and triggered by various criteria such as age, geographic location, network identity or software version of VDI client 110 or firmware version of client device 108. Cached profiles can also be evicted and replaced on demand by UIV agent 204 as needed. In some embodiments, UIV profile 144 may specify how UIV client 202 can instruct VDI client 110 via client-side hooks to generate an application-specific native GUI element corresponding to a GUI element of the application.

For example, UIV augmentations may be provided for legacy productivity applications, such as the Microsoft® PowerPoint® presentation application. Some productivity applications permit users to insert shapes and other graphics into a document. However, tasks such as selecting shape objects and drawing arrows and curved lines can require fine-grain mouse navigation that is challenging to perform from a touch-and-gesture interface. According to one embodiment, UIV client 202 may generate and display a drawing aid as a native GUI element based on UIV profile 144 associated with an application having a drawing tool GUI. UIV agent 204 may detect when an application 210 presents a drawing tool GUI, for example, when a user navigates to a "Home" tab containing a shapes palette, and transmit UI metadata specifying activation of the drawing tool GUI to UIV client 202. UIV client 202 may activate a context-sensitive UIV button on client GUI 260 that, when selected, generates and displays a native drawing aid GUI element having a callout that includes a corresponding palette of shape categories, such as "Lines," "Rectangles," "Basic Shapes," "Block Arrows," and "Flow Chart." The native GUI element may be configured in a tablet friendly way to show the shape categories as icons which then expose their member shapes when selected. The native drawing aid GUI element detects when a user drops a shape onto a working document, for example, when a user selects, drags the shape, and lifts their finger off the touch screen, and presents a tuning interface to facilitate insertion of the selected shape. In some embodiments, the tuning interface may present the area of the document in which the shape was dropped as zoomed in for ease of a fine-grained placement of the shape. In some embodiments, the tuning interface may provide one or more dragging widgets at the boundaries of the selected shape with which a user may stretch or shrink the selected shape using appropriate touch-and-gesture input. As such, while working with shape size and placement, the user may see a zoomed version of their working document. The native drawing aid GUI element may receive an indication that the user has finalized shape size and placement, and generates a UI input event specifying a type, position, and size of the inserted shape. For example, the native drawing aid GUI element receives an indication that the user has tapped an "insert" button of the native drawing aid GUI element and generates a UI input event that specifies a rectangle having a particular height and width has been inserted at a particular location in the document. The UIV host agent running on the remote desktop receives the UI input event specifying the drawing input and makes one or more API calls to the interface interaction API 208 based on the received UI input event 230 and further based on application specific hints within UIV profile 144. In some embodiments, the UIV host agent calls one or more desktop-side hooks provided by the UIV agent 204 to programmatically manipulate the corresponding drawing tool GUI as modeled by UIV profile 144 to insert the appropriate shape into the working document.

In one embodiment, UIV client 202 may further provide native GUI elements for dragging and modifying placed objects, such as shapes and textboxes, according to UIV profile 144. Finding small drag-and-resize corners of shapes (e.g., text boxes) may be particularly frustrating on a tablet device. As such, UIV agent 204 may be configured to detect selection of an inserted object of a document according to UIV profile 144, and transmit UI metadata specifying a selected object and its object coordinates. Responsive to receiving such UI metadata, UIV client 202 may activate a client-side resize option which generates a native resize GUI element overlaid on the selected object. In some embodiments, the native resize GUI element may include thick lines and drag-and-resize widgets configured to be manipulated using touch-and-gesture input. UIV client 202 may receive input on the native resize GUI element and transmit a corresponding UI input event having coordinates of the resized or moved target object. UIV agent 204 makes one or more API calls to interface interaction API 208 to programmatically modify size and placement of the target object based on the UI input event and further based on UIV profile 144.

According to one embodiment, UIV client 202 may generate and display a native font selection GUI element based on UIV profile 144 associated with an application having a font selection GUI. Many productivity applications often provide font sizing, selection, and style modifications to text. The native font selection GUI element may provide a similar context-sensitive pop-out that enables local selection of fonts, font sizes, and other styles. For example, UIV client 202 may use UI metadata 220 derived from a conventional drop-down list of font names on remote desktop 250 to generate a native GUI element that appears like a large wheel of font names that spins in response to swipe gestures. In some embodiments, bolding, underlining, italics may presented as touch-sensitive buttons, and font colors may be rendered in a pop-out color palette selection grid.

In one embodiment, UIV client 202 may generate and display a native animation selection GUI element based on UIV profile 144 associated with an application having an animation selection GUI. In some cases, animation selection may involve cycling through available animation options and waiting until a sample animation clip plays for each option. In a VDI environment, display protocol latency and bandwidth can make this task a jittery and frustration experience. In one embodiment, UIV client 202 may activate a context-sensitive UIV button on client GUI 260 that, when selected, generates and displays a native animation selection GUI element having a callout that includes a pre-defined number of animations presented locally on VDI client 110, such as "Fades", "Dissolves," etc. By creating a compact local animation, the native GUI element enables a user to preview and make an animation selection without taxing the remote session's CPU and generating excessive display protocol traffic. Furthermore, embodiments of the present invention prevent poorly-performing and higher latency networks from having a substantial impact on user experience during animation selection.

According to one embodiment, UIV client 202 may generate and display a native wizard GUI element based on UIV profile 144 associated with an application having custom wizards and dialog boxes. For example, a presentation application may have an Insert Chart dialog that contains a large number of options and types. In one embodiment, UIV agent 204 may generate UI metadata describing one or more wizards or dialog boxes upon detecting an Insert tab or menu option corresponding to the wizard or dialog box is selected at the application. UIV agent 204 may transmit the UI metadata in addition to a copy of icons and other graphical data in the wizard or dialog box to UIV client 202 according to UIV profile 144. UIV client 202 may provide a local pop-out, for example, a touchscreen-friendly grid of local copies of the icons, which may be drilled down by section to simplify selection and placement of a chart object.

Figure 5:
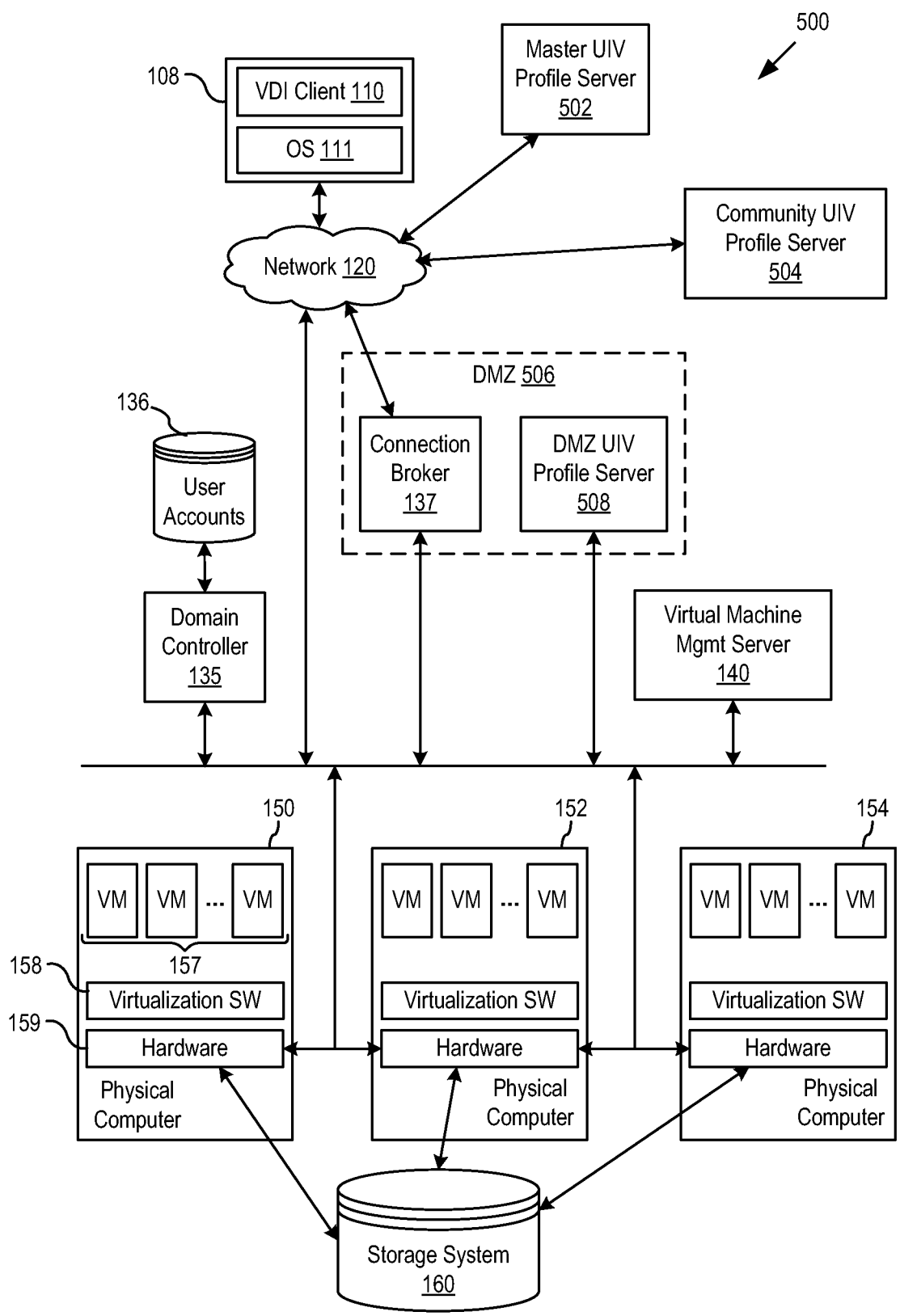
FIG. 5 illustrates components of an alternate embodiment of the VDI system in which one or more embodiments of the present invention may be implemented.

FIG. 5 illustrates components of a VDI system 500 in which one or more embodiments of the present invention may be implemented. Similar to VDI system 100, VDI system 500 includes at least one VDI client 110 connecting to access desktops running on virtual machines 157. In the embodiment shown, VDI system 500 may include a plurality of UIV profile servers, including a master UIV profile server 502, community UIV profile server 504, and a DMZ UIV profile server 508, configured to retrieve and serve UIV profiles in response to requests from VDI clients 110 and VDI host agents running on virtual machines 157. The plurality of UIV profile servers provides tiered levels of access and authenticity for UIV profiles. In one embodiment, master UIV profile server 502 may be managed by a provider of VDI system 500 and provides trusted UIV profiles to VDI clients 110 and VDI host agents 200, for example, signed by a digital certificate or other authority.

In one embodiment, community UIV profile server 504 may be managed by a community of application providers, vendors, and other third parties and provides UIV profiles written by the community to VDI clients 110 and VDI host agents 200. Accordingly, application providers, vendors, and other third parties may get involved themselves in creating UIV profiles for their own applications running in VDI environments such as VDI system 500. In some embodiments, community UIV profile server 504 may include quality control features that tests UIV profiles and indicates when a given UIV profile has been tested and/or confirmed to be working In one embodiment, VDI system 500 may include a DMZ UIV profile server 508 located in a customer's restricted network area, or DMZ 506. Co-locating DMZ UIV profile server 508 within VDI system 500 enables efficient and secure updating of select UIV profile data elements directly to VDI clients 110 such as periodic icon and widget image updates for insertion into the image cache of VDI clients along with secure receipt of UIV profile updates federated by the external community UIV profile server 504. In one embodiment, upon application launch, VDI host agent 200 pulls a UIV profile into a user's login profile if absent, or checks that an existing UIV profile is a latest version. In one embodiment, DMZ UIV profile server 508 may periodically communicate with master UIV profile server 502 to obtain local and up-to-date copies of trusted UIV profiles, for example, by subscribing to a feed of UIV profiles (e.g., via RSS subscription) provided by master UIV profile server 502 or by community UIV Profile server 504.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of providing access to a remote desktop of a server device having a guest operating system executing therein, the method comprising:
    launching an application in the remote desktop of the server device, wherein the application includes one or more elements of a graphical user interface (GUI);
    retrieving a user interface virtualization profile associated with the application;
    generating user interface (UI) metadata that specifies the GUI of the application, wherein the UI metadata is generated according to the user interface virtualization profile and using an application programming interface (API) configured to programmatically manipulate the GUI of the application;
    transmitting a base image of the GUI and the generated UI metadata to a touch input client device communicatively connected to the server device;
    receiving, from the touch input client device, an input event indicating manipulation of the GUI of the application; and
    invoking the API to programmatically manipulate the GUI of the application according to the received input event and further according to the user interface virtualization profile,
    wherein the user interface virtualization profile associated with the application specifies application-specific support for the API configured to programmatically manipulate the GUI of the application.

2. The method of claim 1, further comprising:
    receiving, from the touch input client device, usage data associated with user interactions with the GUI of the application; and
    modifying the user interface virtualization profile associated with the application based on the received usage data.

3. The method of claim 1, wherein the user interface virtualization profile specifies a call to a desktop-side procedure comprised of one or more calls to the API to generate the UI metadata corresponding to the GUI of the application.

4. The method of claim 1, wherein the user interface virtualization profile specifies a call to a desktop-side procedure comprised of one or more calls to the API to programmatically manipulate the GUI of the application responsive to a received input event.

5. The method of claim 1, wherein the user interface virtualization profile comprises a federated profile retrieved from at least one of a master user interface virtualization profile server and a community-based user interface virtualization profile server.

6. The method of claim 1, wherein the generating the UI metadata further comprises, responsive to detecting a selection of a shape object in a document for the application, generating UI metadata that specifies a position and size of the selected shape object based on the user interface virtualization profile; and
    wherein the invoking the API of the guest operating system further comprises, responsive to receiving the input event, invoking the API to programmatically manipulate the position and size of the selected shape object based on the input event and the user interface virtualization profile.

7. The method of claim 1, wherein the generating the UI metadata further comprises generating the UI metadata that specifies a drawing tool GUI for the application based on the user interface virtualization profile; and
    responsive to receiving the input event, invoking the API to programmatically manipulate the drawing tool GUI for the application based on the input event and the user interface virtualization profile.

8. A non-transitory computer-readable storage medium comprising instructions that, when executed in a computing device, provide access to a remote desktop of a server device having a guest operating system by performing the steps of:
    launching an application in the remote desktop of the server device, wherein the application includes one or more elements of a graphical user interface (GUI);
    retrieving a user interface virtualization profile associated with the application;
    generating user interface (UI) metadata that specifies the GUI of the application, wherein the UI metadata is generated according to the user interface virtualization profile and using an application programming interface (API) configured to programmatically manipulate the GUI of the application;
    transmitting a base image of the GUI and the generated UI metadata to a touch input client device communicatively connected to the server device;
    receiving, from the touch input client device, an input event indicating manipulation of the GUI of the application; and
    invoking the API to programmatically manipulate the GUI of the application according to the received input event and further according to the user interface virtualization profile,
    wherein the user interface virtualization profile associated with the application specifies application-specific support for the API configured to programmatically manipulate the GUI of the application.

9. The non-transitory computer-readable storage medium of claim 8, further comprising:
receiving, from the touch input client device, usage data associated with user interactions with the GUI of the application; and
modifying the user interface virtualization profile associated with the application.

10. The non-transitory computer-readable storage medium of claim 8, wherein the user interface virtualization profile specifies a call to a desktop-side procedure comprised of one or more calls to the API to generate the UI metadata corresponding to the GUI of the application.

11. The non-transitory computer-readable storage medium of claim 8, wherein the user interface virtualization profile specifies a call to a desktop-side procedure comprised of one or more calls to the API of the guest operating system to programmatically manipulate the GUI of the application responsive to a received input event.

12. The non-transitory computer-readable storage medium of claim 8, wherein the user interface virtualization profile comprises a federated profile retrieved from at least one of a master user interface virtualization profile server and a community-based user interface virtualization profile server.

13. The non-transitory computer-readable storage medium of claim 8, wherein the step of generating the UI metadata further comprises, responsive to detecting a selection of a shape object in a document for the application, generating UI metadata that specifies a position and size of the selected shape object based on the user interface virtualization profile; and
wherein the step of invoking the API further comprises, responsive to receiving the input event, invoking the API to programmatically manipulate the position and size of the selected shape object based on the input event and the user interface virtualization profile.

14. The non-transitory computer-readable storage medium of claim 8, wherein the step of generating the UI metadata further comprises generating the UI metadata that specifies a drawing tool GUI for the application based on the user interface virtualization profile; and
wherein the step of invoking further comprises, responsive to receiving the input event, invoking the API to programmatically manipulate the drawing tool GUI for the application based on the input event and the user interface virtualization profile.

15. A computer system for providing access to a remote desktop, the computer system comprising a system memory and a processor programmed to carry out the steps of:
launching an application in the remote desktop of the computer system, wherein the application includes one or more elements of a graphical user interface (GUI);
retrieving a user interface virtualization profile associated with the application;
generating user interface (UI) metadata that specifies the GUI of the application, wherein the UI metadata is generated according to the user interface virtualization profile and using an application programming interface (API) configured to programmatically manipulate the GUI of the application;
transmitting a base image of the GUI and the generated UI metadata to a touch input client device communicatively connected to the computer system;
receiving, from the touch input client device, an input event indicating manipulation of the GUI of the application; and
invoking the API to programmatically manipulate the GUI of the application according to the received input event and further according to the user interface virtualization profile,
wherein the user interface virtualization profile associated with the application specifies application-specific support for the API configured to programmatically manipulate the GUI of the application.

16. The computer system of claim 15, wherein the user interface virtualization profile specifies a call to a desktop-side procedure comprised of one or more calls to the API to generate the UI metadata corresponding to the GUI of the application.

17. The computer system of claim 15, wherein the user interface virtualization profile specifies a call to a desktop-side procedure comprised of one or more calls to the API to programmatically manipulate the GUI of the application responsive to a received input event.

* * * * *